United States Patent [19]
Sakuragi et al.

[11] Patent Number: 5,367,447
[45] Date of Patent: Nov. 22, 1994

[54] SIGNAL SEPARATION CIRCUIT

[75] Inventors: Satosi Sakuragi; Takashi Kuroda, both of Kanagawa, Japan

[73] Assignee: Murata Mfg. Co., Ltd., Kyoto, Japan

[21] Appl. No.: 70,593

[22] Filed: Jun. 1, 1993

[30] Foreign Application Priority Data

Jun. 8, 1992 [JP] Japan .................................. 4-146082

[51] Int. Cl.$^5$ ..................... H02M 1/14; H02M 3/335
[52] U.S. Cl. ........................................ 363/39; 363/16; 379/400; 379/413
[58] Field of Search ................. 323/222, 282, 351; 363/16, 95, 97, 39; 379/399, 400, 413

[56] References Cited

U.S. PATENT DOCUMENTS 4,410,766  10/1983  Beirne ........................ 323/284 X Primary Examiner—Emanuel T. Voeltz
Attorney, Agent, or Firm—Jordan and Hamburg

[57] ABSTRACT

A signal separation circuit for separating direct current power on a telephone with a transistor. A CPU, which includes an A/D converter, is connected to detect the emitter-collector voltage of the transistor, and to control the base current of the transistor to maintain the emitter-collector voltage constant.

5 Claims, 3 Drawing Sheets

5,367,447

SIGNAL SEPARATION CIRCUIT

FIELD OF THE INVENTION

This invention relates to signal separation circuits and in particular to signal separation circuits for separating a direct-current power from a signal consisting of an alternate-current component and a direct-current component.

BACKGROUND OF THE INVENTION

FIG. 3 is a circuit diagram of a line terminal device 501 including the conventional signal separation circuit 51.

In the line terminal device 501, the signal separation circuit 51 separates direct electric current power from line signals supplied from the telephone line through a bridge diode BD and a hook switch HS, and dissipating the direct-current power in a load resistance RW.

In other words, in the signal separation circuit 51, the base current for a DC separation transistor Q1 is supplied using the direct-current component of the line signal by a base resistor RB and a base capacitor CB, thereby separating the direct-current power between the collector and the emitter.

Since the base resistance RB is fixed in the conventional signal separation circuit 51 described above, the voltage between the collector and the emitter fluctuates depending on the changes in line current I to produce fluctuation of the collector loss.

Thus, the problem encountered in the conventional signal separation circuits is that, the DC separation transistor Q1 has to be selected by estimating the maximum collector loss, and transistor having a large rating has to be used.

SUMMARY OF THE INVENTION

It is a general object of this invention to provide a signal separation circuit capable of maintaining a minimized loss in a DC separation transistor irrespective of the line current I.

The signal separation circuit of this invention, a circuit in which a base current of a transistor is supplied by a direct-current component of a signal consisting an alternate-current component and a direct-current component, and by passing it through the collector and emitter of said transistor, a direct-current power is separated from said signal, comprises a voltage detecting means for detecting a voltage between the collector and the emitter of the transistor, and a base current control means for controlling the base current of said transistor so as to hold at a predetermined proper value, the voltage between the collector and the emitter of the transistor.

In operation, the signal separation circuit of this invention detects the voltage between the collector and the emitter with a voltage detecting means, and controls the base current by the base current control means so that the voltage between the collector and the emitter assumes a predetermined proper value.

As a result, the voltage between the collector and emitter is prevented from attaining a value larger than required. This minimizes the loss arising in transistors and therefore, it becomes possible to use even transistors having a small rating.

BRIEF DESCRIPTION OF THE DRAWINGS

The invention is illustrated diagrammatically in the following drawings wherein.

DESCRIPTION OF THE PREFERRED EMBODIMENT

One embodiment of this invention will be described in more detail referring to the accompanying drawings. While the embodiments of the present invention, as herein disclosed, constitute a preferred form, it is to be understood that other forms might be adopted.

Figure 1:
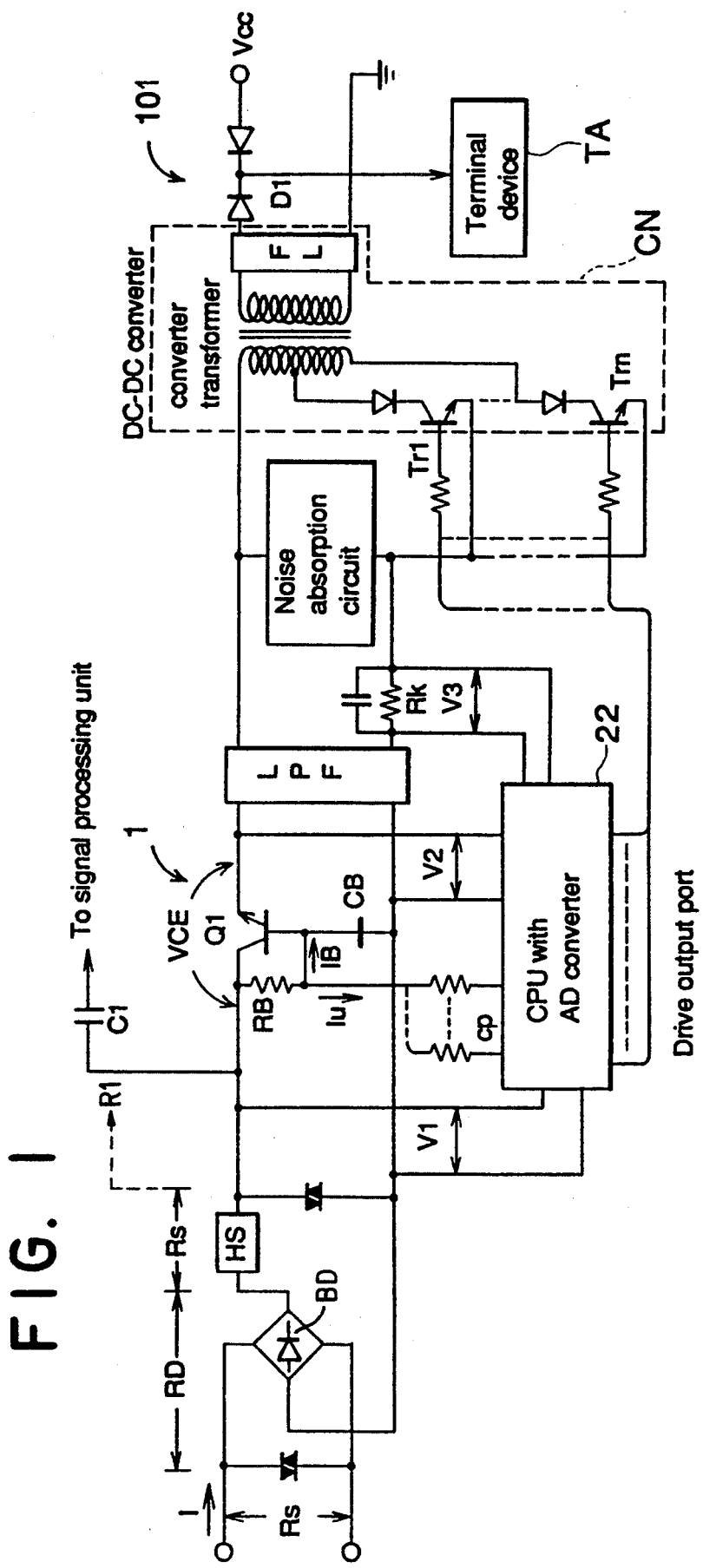
FIG. 1 is a main circuit diagram of a telephone line power utilization circuit including the signal separation circuit of one embodiment of this invention.

FIG. 1 is a main circuit diagram of a telephone line power utilization circuit 101 including a signal separation circuit 1 in accordance with one embodiment of the invention.

In the above mentioned telephone line power utilization circuit 101, a direct-current power, which is separated from a line signal inputted from the telephone line side through a bridge diode BD and a hook switch HS by a DC separation transistor Q1, is supplied to a line terminal device main-body circuit TA through a low-pass filter LPF, a DC-DC converter CN and a diode D1.

Vcc is an external power source such as batteries or the like to constitute a power source for the line terminal device main-body circuit TA when the output from the DC-DC converter CN is insufficient.

The alternate-current component (signal component) is applied to a signal processing circuit (not shown) of the line terminal device main-body circuit TA and is processed after passing through a direct-current blocking capacitor C1 after passing through and the hook switch HS.

The base current IB of the DC separation transistor Q1 is comprised of the direct-current component taken out from the line signal by a base resistance RB and a base capacitor CB, but it is controlled by changes in bias control current Iu by a CPU 22 having an AD converter.

The CPU 22 having the AD converter detects the collector voltage V1 and the emitter voltage V2 of the DC separation transistor Q1, detects a voltage VCE between the collector and the emitter based on the difference thereof and changing the bias control current Iu by controlling a control port CP so that the voltage VCE between the collector and the emitter becomes a predetermined proper value.

In this way, the voltage VCE between the collector and emitter is maintained at a predetermined proper value to minimize losses.

A plurality of taps are provided on the primary side of a converter transformer of a DC-DC converter CN, and switching elements Tri-Trn are connected to separate ones of these taps.

The CPU 22 having the AD converter alternatively selects and operates one of the switching elements Tri-Trn, and switches the number of turns of a primary winding of the converter transformer of the DC-DC converter CN, and performs an action such that the input direct-current resistance R1 of the DC-DC converter CN attains a maximum value in a range equal to or less than 300 Ω of a direct-current resistance of the line terminal equipment viewed from the telephone line-side.

As a result, the direct-current power supplied from the telephone line can be effectively received.

Figure 2:
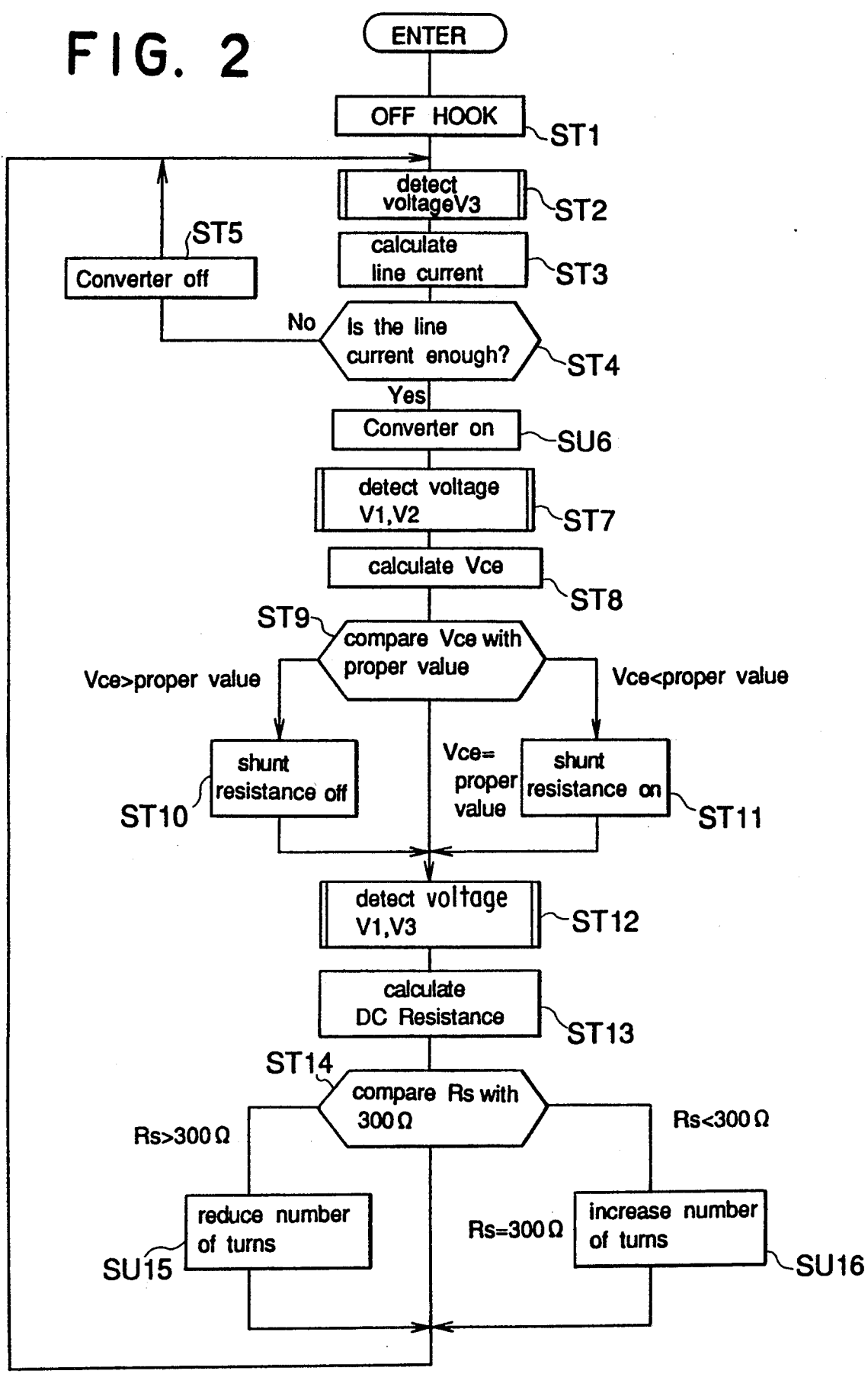
FIG. 2 is a flow chart showing the operations of the telephone line power utilization circuit of FIG. 1 and, FIG. 3 is a main schematic diagram of a line terminal device including a conventional signal separation circuit.
Figure 3:
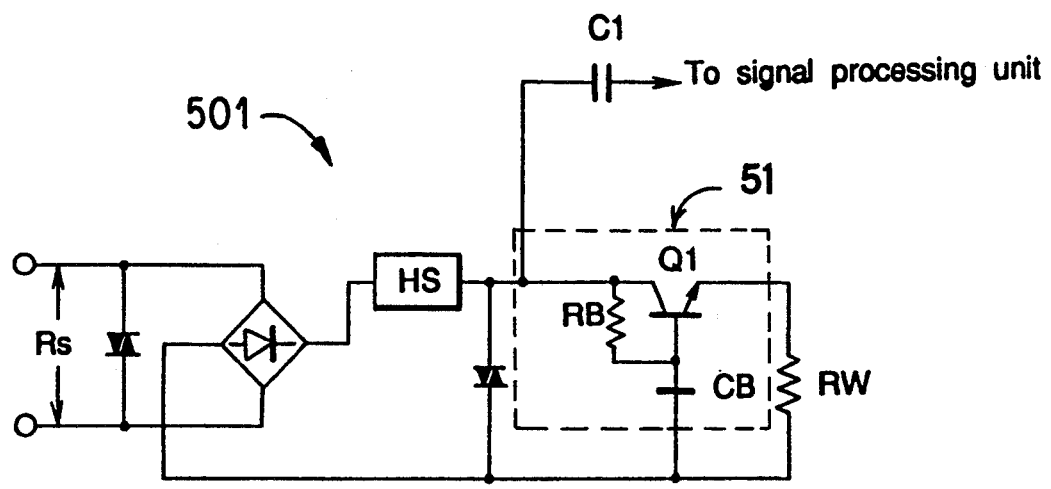

FIG. 2 is a flow chart showing operations of the CPU 22 having the AD converter.

When the hook switch HS is in an OFF hook state (step ST1), the voltage V3 in FIG. 1 is detected (step ST2), and line current I is calculated (step ST3) by $$I = V3/Rk,$$

where, Rk represents the resistance value of the current detecting resistance.

Next, it is determined whether or not the line current I reaches the minimum current (approximately 15 mA) (step ST4). If the line current I does not reach the minimum current, the process proceeds to step ST5, and if it reaches the minimum current, the process proceeds to step SU6.

In step ST5, the DC—DC converter CN is switched off, and the process returns to step ST2.

In step SU6, the DC—DC converter CN is switched on. At this time, the alternatively selected switching element in operation is stored in the memory as a switching element. When the switching element is not stored in the memory, a switching element in which the number of turns of the winding becomes minimum (at this time, the input direct-current resistance R1 of the DC-DC converter CN becomes minimum) is assumed.

In the next step, voltages V1 and V2 in FIG. 1 are detected (step ST7), and the voltage VCE between the collector and the emitter of the DC separation transistor Q1 is calculated (step ST8).

Next, the voltage VCE is compared with a proper value (step ST9). This proper value is, for example, ½ the amplitude (2 V in case of modem) of the signal component.

If the voltage VCE is greater than the proper value, then the process proceeds to step ST10. If the voltage VCE is less than the proper value, then the process proceeds to step ST11. If the voltage VCE is equal to the proper value, then the process proceeds to step ST12.

In step ST10, the control port CP is controlled to increase the bias shunt resistance value and to decrease the bias control current Iu. Thus, the bias current IB becomes large and the collector-emitter voltage VCE tends to be smaller.

In step ST11, the control port CP is controlled to make the bias shunt resistance value small and to increase the bias control current Iu. Thus, the collector-emitter voltage VCE tends to be larger.

Finally, the collector-emitter voltage VCE is made to converge to the proper value through the operations from step ST7 to step ST11. For this reason, it becomes possible to use a transistor having a small rating.

In step ST12, the voltages V1 and V3 are detected.

Next, the direct-current resistance RS of the telephone line power utilization circuit 1 viewed from the telephone line-side is calculated (step ST13) using equations, $$I = V3/Rk \text{ and}$$

$$RS = (V1/I) + (RD + RH)$$

In the next step, the direct-current resistance RS calculated using the above equations is compared (step ST14) with 300 Ω (preferably, a little less than 300 Ω). If the resistance RS is greater than 300 Ω, then the process proceeds to step ST15. If the resistance RS is less than 300 Ω, then the process proceeds to step ST16. When the resistance RS equals to 300 Ω, the process returns to the step ST2 described earlier.

In the step SU15, a switching element, with a smaller number of winding turns than the present is selected. Thus, the direct-current resistance RS changes to attain a smaller value. Thereafter, said switching element is stored in the memory, and then the process returns to step ST2. In the step SU16, a switching element, with more winding turns than the present is selected. Thus, the direct-current resistance RS changes to attain a larger value. Thereafter, said switching element is stored in the memory, and then the process returns to step ST2.

In this way the direct-current resistance RS is made to converge to 300 Ω by the operations from step ST12 to step SU16.

As a result above, the loss in the DC separation transistor Q1 becomes minimum and the input direct-current resistance R1 of the DC—DC converter CN becomes largest within the possible range, effectively receiving the direct-current power supplied from the telephone lines.

The inputted direct-current resistance R1 of the DC—DC converter CN may be controlled by changing the duty ratio for pulse driving the switching element(s) Tr1 (or Tri-Tra) instead of (or including) the control of switching the taps of the primary-side winding of the converter transformer of the DC—DC converter CN.

In the signal separation circuit of this invention, the loss in the transistor for separating the direct-current power can be maintained at a minimum value. Therefore, it is possible to use transistors having a small value of rating.

What is claimed is;

1. A signal separation circuit for separating a direct-current power from a signal having a direct current component and an alternate-current component by passing said signal through the collector-emitter path of a transistor, comprising:

a voltage detecting means for detecting the emitter-collector voltage of said transistor; and a base current control means for controlling the base current of said transistor to hold said emitter-collector voltage of said transistor at a predetermined value.

2. A signal separation circuit for separating direct-current power from a signal having a direct current component and an alternate-current component, comprising a source of said signal, a transistor having an emitter-collector current path and a base, a load circuit, means connecting said source to said load circuit via said emitter-collector path of said transistor, means for detecting the emitter-collector voltage of said transistor; and means for controlling the base current of said transistor to hold said emitter-collector voltage of said transistor at a predetermined value.

3. A signal separation circuit for separating direct-current power from a signal having a direct current component and an alternate-current component, comprising a source of said signal, a transistor having an emitter-collector current path and a base, a load circuit, means connecting said source to said load circuit via said emitter-collector path of said transistor, and a CPU connected to measure the emitter-collector voltage of said transistor and to control the base current of said transistor to hold said emitter-collector voltage at a predetermined value.

4. The signal separation circuit of claim 3 wherein said means connecting said source to said load circuit comprises a rectifier and hook switch, and further comprising a capacitor connected between said hook switch and emitter-collector path of said transistor for outputting said alternate-current component.

5. The signal separation circuit of claim 3 wherein said CPU has a AD converter with inputs connected to detect the emitter and collector voltages of said transistor.

* * * * *